Patented Aug. 12, 1952

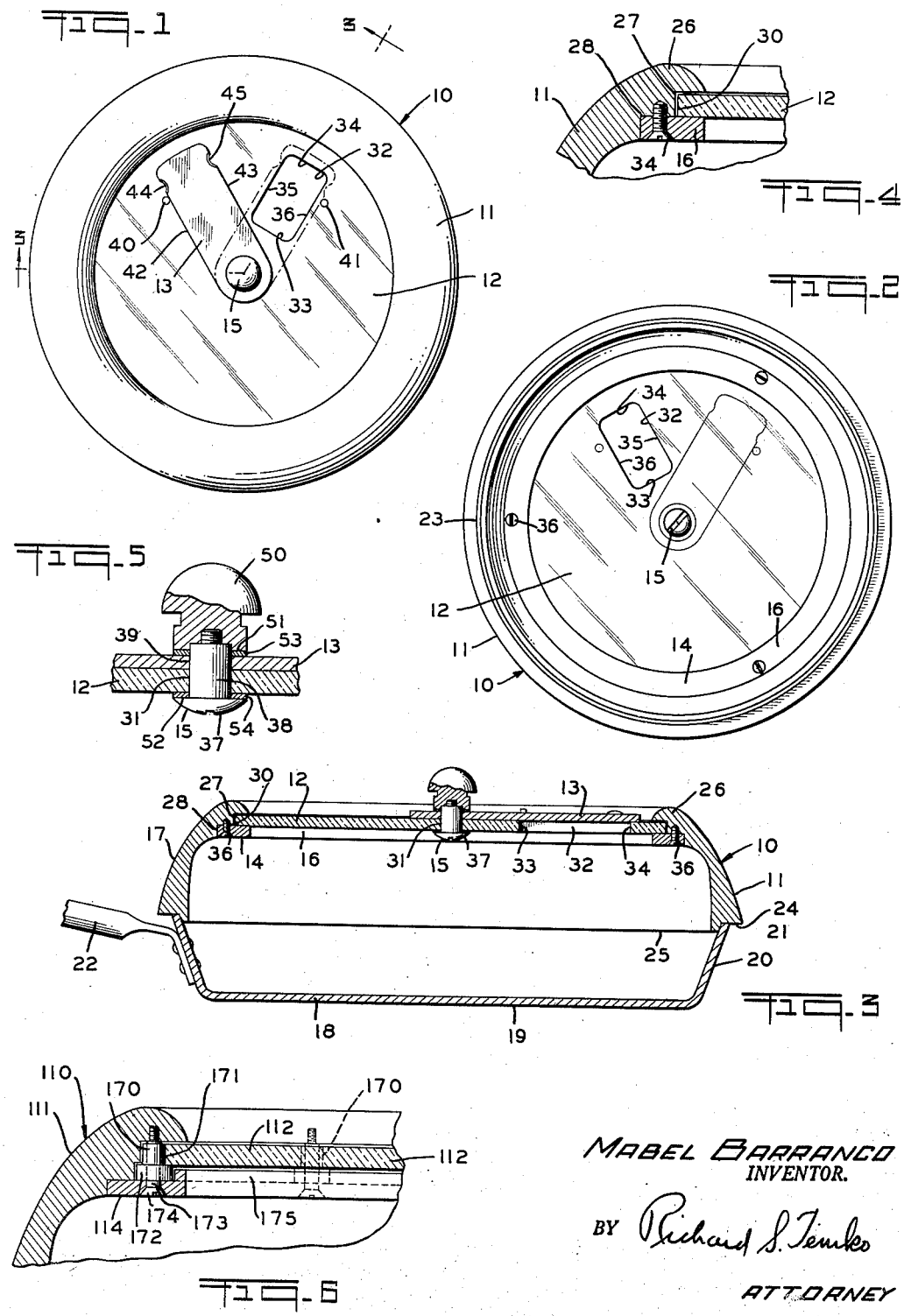

2,606,686

UNITED STATES PATENT OFFICE 2,606,686

COOKING UTENSIL COVER

Mabel Barranco, New York, N. Y.

Application July 22, 1947, Serial No. 762,772

1 Claim. (Cl. 220—44)

This invention relates generally to cooking utensils and more particularly to covers therefor.

In many cooking processes, it is desirable that the food being treated be visible and yet protect it from the ambient air. Furthermore, in such processes it is frequently desirable to prevent fumes or particles cast from the heated mass from escaping proscribed areas. Furthermore, it is often desirable to be able to manipulate the food while it is cooking without reducing to a substantial degree, the conditions just described.

It is therefore among the objects of the present invention to provide cooking utensil cover structures through which the progress of the cooking operation may be observed by the user.

It is another object herein to provide cooking utensil cover structure in which the food being treated, except at desired times, is excluded from contact with the ambient air.

Another object herein lies in the provision of structure of the class described which prevents fumes, caused by boiling or otherwise, and particles cast by frying operations, from going beyond a proscribed area.

Another object herein lies in the provision of cover structure which affords means for inspecting the progress of the cooking process, both visually and by olefactory preception, and for manipulating the contents of the cooking vessel without removing the main cover.

These objects and other incidental ends and advantages will more fully apear in the progress of this disclosure and be pointed out in the appended claim.

In the drawings in which similar reference characters designate corresponding parts throughout the several views:

Fig. 1 is a plan view of a cover showing a first embodiment of the invention.

Fig. 2 is a bottom plan view of the cover.

Fig. 3 is an enlarged fragmentary vertical sectional view, as seen from the plane 3—3 on Fig. 1, with the cover mounted upon a cooking vessel.

Fig. 4 is an enlarged fragmentary detail sectional view corresponding to the upper left portion of Fig. 3.

Fig. 5 is an enlarged fragmentary detail sectional view corresponding to the upper central portion of Fig. 3.

Fig. 6 is a fragmentary sectional view corresponding generally to Fig. 4, but showing a second embodiment of the invention.

In accordance with the invention, as illustrated in Figs. 1-5 inclusive, the cooking utensil cover device is indicated generally by reference character 10 and includes broadly a (first) relatively stationary cover element 11; a (second) relatively movable cover element 12; a (third) relatively movable auxiliary cover element 13; first means 14 to mount the second cover element upon the first cover element; and second means 15 to mount the auxiliary cover element upon the second movable cover element.

The first or relatively stationary cover element 11 serves as a base and is of annular construction. It has a continuous side wall 17 of substantial height so as to position the second cover element 12, at a distance which is greater than normal, from the bottom wall 18, of the cooking utensil 19. As will be obvious to those skilled in the art to which the present invention relates, my cover device 10 may be utilized in conjunction with various types of cooking utensils, but by way of example, I have shown it in combination with a cooking utensil of the skillet or frying pan type. The utensil 19 may thus have an upstanding annular wall 20 with a relatively free edge 21. The utensil 19 may have a handle 22 secured thereto. The bottom portion of the side wall 17 is provided with an annular recess 23 so as to form an upper surface 24 and a depending flange 25. The upper portion 26 of the cover element 11 is provided with an upper rabbet 27 and a lower rabbet 28, both of which are annular. The base cover element 11 is preferably composed of metal, as for example cast aluminum, and the effective external diameter of the flange 25 may be of course varied to accommodate utensils 19 having different internal diameters at the edge 21. Other means, well known in the art, may be used to secure an engagement between the lower portion of the first cover element 11 and the particular utensil with which it is used.

The second cover element 12, at the edge 30 thereof is of a size and shape to conform to the size and shape of the upper rabbet 27, and is slideably maintained in the upper rabbet by the first means 14. The means 14 is preferably in the form of a retainer ring 16 which is detachably secured at a plurality of points within the lower rabbet 28 in any suitable manner, as for example by the screws 36. Sufficient clearance is allowed between the edge 30 and the rabbet 27 so that even when the cover element 12 and the cover element 11 are expanded because of elevated temperature, the cover element 12 may be rotated.

The cover element 12, as shown, is preferably of circular shape and composed of heat resisting transparent material such as heat resisting glass or "Pyrex." The cover element 12 is provided with an orifice 31 and an opening 32. The opening 32 is preferably of generally rectangular shape having an inner edge 33, an outer edge 34 and side or radial edges 35 and 36. The opening 32 is preferably of sufficient size to admit therethrough a suitable implement (not shown) such as a fork, knife or spoon with the aid of which the contents (not shown) of the utensil 19 may be stirred, cut, lifted or turned.

The auxiliary cover element 13 is of sufficient size in the closed position thereof to completely obstruct passage through the opening 32, and in the open position thereof to clear said opening. The auxilary cover element 13 is pivotally mounted upon the second means 15 which may take the form of a shoulder bolt 37. The shank 38 of the bolt 37 extends through an orifice 39 in the cover element 13. The cover element 12 is provided with a pair of detents 40 and 41 which limit the movement of the auxiliary cover element 13 in the opening and closing directional movements thereof. The lateral edges 42 and 43 of the cover element 13 are provided with upwardly extending flanges 44 and 45 which may be readily engaged by the implement (not shown) which it is intended to project downwardly through the opening 32. This enables the cover element 13 to be shifted from the open position shown in the full lines of Figs. 1 and 2 to the closed position thereof shown in the dot dash lines of Fig. 1, or vice versa.

The upper terminal of the bolt 37 threadedly engages the handle 50 which serves to elevate the device 10 when it is desired to place or remove it with respect to the cooking utensil 19. In order to facilitate the ease of pivotal movement of the auxiliary cover element 13 so that a lesser degree of friction is presented in such movement than in the rotary movement of the cover element 12, the shank 38 has the upper shoulder thereof seated in the handle 50 so that the handle 50 reaches a definite position so that the distance between the surface 51 and the surface 52 may be predetermined. This also prevents the cracking of the cover element 12 because of undue pressure. Undesirable play or looseness in the parts as assembled is taken up by the washers 53 and 54 which may be of a soft or resilient material, such as copper, fiber, or synthetic rubber.

The present device is easy and convenient to use. When the food (not shown) lies within the confines of the device 10 and the cooking utensil 19, the progress of the cooking may be inspected through the transparent cover element 12. If owing to condensation vision is impaired through the cover element 12, the auxiliary cover element 13 may be shifted to its open position and the contents inspected through the opening 32. A cooking implement may now be inserted through the orifice 32 for the purpose of altering the position of the food. Should it be desired to treat another portion, pressure of the cooking implement upon the edges 35 or 36 will cause the cover element 12 to rotate in a counterclockwise or clockwise direction (as viewed in Fig. 1) so that access may be gained to a different area of the bottom 18. After this operation, pressure of the cooking implement upon the flange 44 will close the auxiliary cover element 13. It may thus be seen that it is not necessary to touch these parts which are at an elevated temperature with the user's hands. Furthermore, the reduced aperture provided by the opening 32 substantially prevents undesirable splashing or splattering, particularly encountered during frying operations. Should it be desired to remove the cover element 12 from the other parts, as for cleaning or replacement, it is necessary only to remove the means 14 by manipulation of the screws 36.

Since the auxiliary cover element 13 is more readily movable than is the cover element 12 when moved in a counter clockwise direction, as shown in Fig. 1, it will reach the stop 40 before the cover element 12 will rotate in a counterclockwise direction, as shown in Fig. 1, it will reach the stop 40 before the cover element 12 will rotate in a counterclockwise direction.

Turning now to the second embodiment of the invention shown in Fig. 6, for the purpose of avoiding needless repetition, parts corresponding to the first embodiment are given the same reference characters with the addition of a prefix "1."

The second embodiment differs from the first embodiment principally in the incorporation of a plurality of rotatable bearings 170 and the cover element 111 and the means 114 are suitably recessed to accommodate them. Any desired number may be utilized although three are preferable. As shown in Fig. 6, each of the bearings 170 include a small diameter portion 171 and a large diameter portion 172. These portions are preferably independent of each other and rotatably mounted on the shank 173 of the screw 174. The shank 173 is preferably of greater length than the combined vertical height portions 172 and 171 so that free rotation of these parts is afforded. The upwardly extending annular flange 175 inhibits the passage of cooking vapors to the bearings. By loosening the screws 174, the means 114 may be removed to replace the cover element 112 or to clean the parts.

I wish it to be understood that I do not desire to be limited to the exact details of construction shown and described, for obvious modifications will occur to a person skilled in the art.

I claim:

A cooking utensil cover comprising: a first relatively stationary cover element of annular form having a circular rabbet; a second cover element disposed within said rabbet; means to slidably support the second cover element upon the first cover element; said means including a plurality of roller bearings, and an annular ring detachably secured to the first cover element; an auxiliary cover element pivotally connected to said second cover element; said second cover element being substantially transparent and having an eccentrically disposed opening and a pair of detents laterally disposed with respect thereto; said auxiliary cover being movable between said detents and adapted in one position to obstruct the opening and in another position to clear the same.

MABEL BARRANCO.

REFERENCES CITED

The following references are of record in the file of this patent:

UNITED STATES PATENTS

| Number | Name | Date |
|---|---|---|
| 473,399 | Lee | Apr. 19, 1892 |
| 906,272 | Paulus | Dec. 8, 1908 |
| 941,041 | Phillips | Nov. 23, 1909 |
| 1,193,954 | Walden | Aug. 8, 1916 |
| 1,230,419 | Lowe | June 19, 1917 |
| 1,275,598 | Probst | Aug. 13, 1918 |
| 1,317,045 | Shawley | Sept. 23, 1919 |
| 1,583,257 | Riggs | May 4, 1926 |

FOREIGN PATENTS

| Number | Country | Date |
|---|---|---|
| 190,389 | Switzerland | Apr. 30, 1937 |
| 519,884 | Great Britain | Apr. 9, 1940 |